United States Patent
Yi et al.

(10) Patent No.: US 9,775,150 B2
(45) Date of Patent: Sep. 26, 2017

(54) STEPWISE SLOT ALLOCATION METHOD AND APPARATUS

(71) Applicant: FUJITSU LIMITED, Kawasaki-shi, Kanagawa (JP)

(72) Inventors: Longteng Yi, Beijing (CN); Hao Wang, Beijing (CN); Xiaojing Fan, Beijing (CN); Jun Tian, Beijing (CN); Taiji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 14/524,337

(22) Filed: Oct. 27, 2014

(65) Prior Publication Data
US 2015/0117416 A1    Apr. 30, 2015

(30) Foreign Application Priority Data
Oct. 28, 2013  (CN) .......................... 2013 1 0516205

(51) Int. Cl.
*H04W 72/04*    (2009.01)
*H04W 84/18*    (2009.01)

(52) U.S. Cl.
CPC ........ *H04W 72/0446* (2013.01); *H04W 84/18* (2013.01)

(58) Field of Classification Search
CPC .......................... H04W 72/0446; H04W 84/18
See application file for complete search history.

(56) References Cited

U.S. PATENT DOCUMENTS

| | | | | |
|---|---|---|---|---|
| 7,308,005 | B1* | 12/2007 | Roggendorf | H04W 28/06 370/326 |
| 2003/0185243 | A1* | 10/2003 | Klotsche | H04L 12/2801 370/498 |
| 2003/0202541 | A1* | 10/2003 | Lim | H04B 1/7083 370/503 |
| 2004/0071107 | A1* | 4/2004 | Kats | H04B 7/2606 370/328 |

(Continued)

FOREIGN PATENT DOCUMENTS

| | | |
|---|---|---|
| CN | 1453948 | 11/2003 |
| CN | 101360339 | 2/2009 |
| CN | 101977414 | 2/2011 |

OTHER PUBLICATIONS

Chinese Office Action dated Aug. 1, 2017 in related Chinese Patent Application No. 201310516205.0.

(Continued)

*Primary Examiner* — Mohammad Anwar
(74) *Attorney, Agent, or Firm* — Staas & Halsey LLP (57) ABSTRACT

A stepwise slot allocation method and apparatus applicable to a node in a wireless network and includes: by the node, determining an initial boundary value of a slot for slot allocation at a current slot allocation stage; calculating a slot length needed by the node at the current slot allocation stage; and selecting a slot index needed by the current slot allocation stage starting from the initial boundary value. By using the method, the slot allocation is combined with an amount of traffic in the network, and slot index of each node is more proper. And it is ensured that one packet corresponds to a slot, and a case will not occur where a slot is reserved but not used.

20 Claims, 6 Drawing Sheets

(56) References Cited

U.S. PATENT DOCUMENTS

2005/0078630 A1* 4/2005 Choi ................. H04W 72/1289
370/329
2009/0122778 A1* 5/2009 Lee ....................... H04W 72/02
370/345

OTHER PUBLICATIONS

Chinese search Report dated Aug. 1, 2017 in related Chinese Patent Application No. 201310516205.0.

* cited by examiner

STEPWISE SLOT ALLOCATION METHOD AND APPARATUS

CROSS REFERENCE TO RELATED APPLICATIONS

This application claims the benefit of Chinese Application No. 201310516205.0, filed Oct. 28, 2013, the disclosure of which is incorporated herein by reference.

TECHNICAL FIELD

The present invention relates to the field of communications and, in particular, to a stepwise slot allocation method and apparatus.

BACKGROUND

Figure 1:
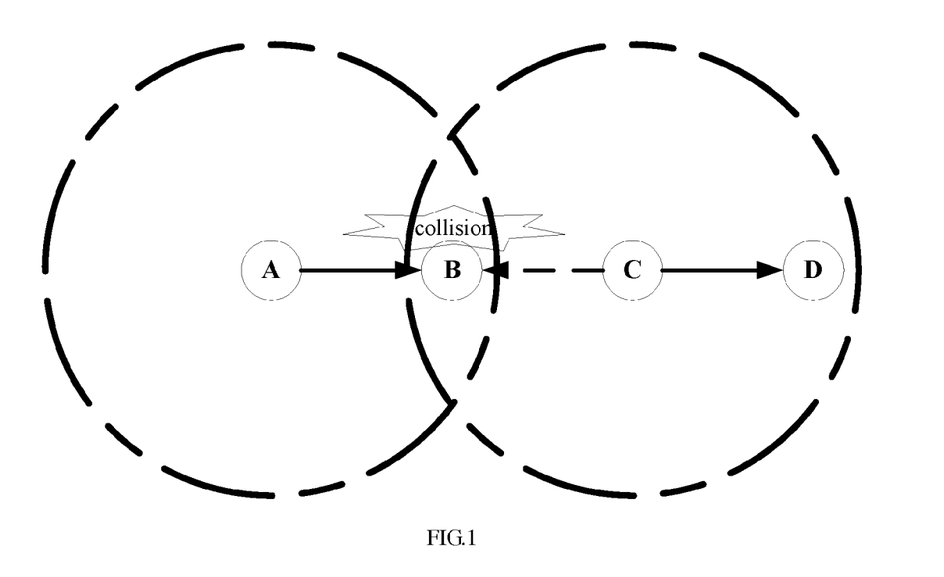
FIG. 1 is a schematic diagram of collision produced when slot assignment is not performed.

In a wireless sensor network, if neighboring nodes transmit data packets of their own at the same time, collision will occur. As shown in FIG. 1, a node A and a node C occupy identical slots to transmit data packets of their own. And as for a neighboring node B, as it receives data packets at this slot, obvious collision is produced.

Figure 2:
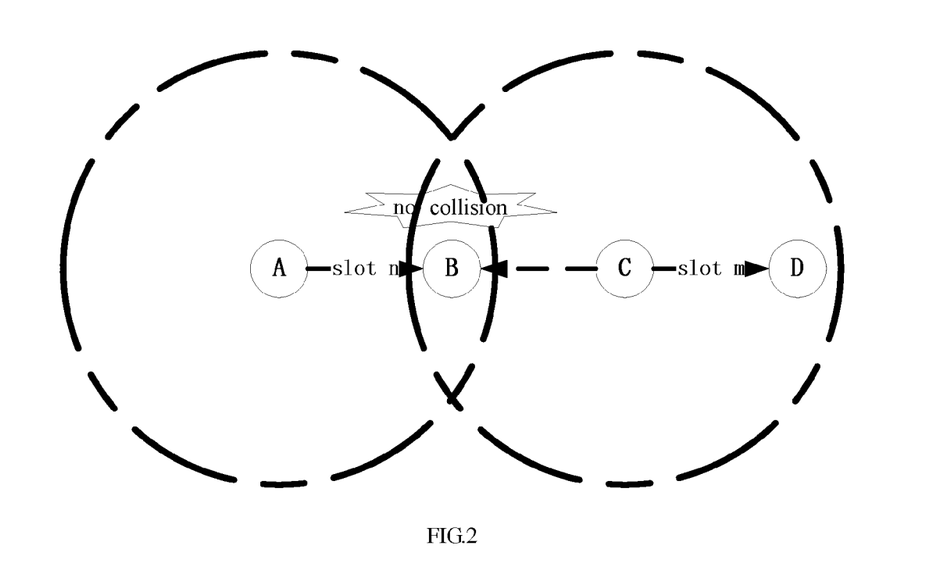
FIG. 2 is a schematic diagram of the produced collision is avoided by slot assignment.

Currently, in order to overcome such collision, a slot assignment method is used, so as to ensure that neighboring nodes transmit data packets of their own at different slots. As shown in FIG. 2, a node A transmits its data packets at a slot n, a node C transmits its data packets at a slot m, and as for a neighboring node B, it receives data packets transmitted by the node A and the node C at different slots. So transmission collision may be avoided, and fewer packets will be dropper, a higher delivery ratio will be achieved.

Figure 3A:
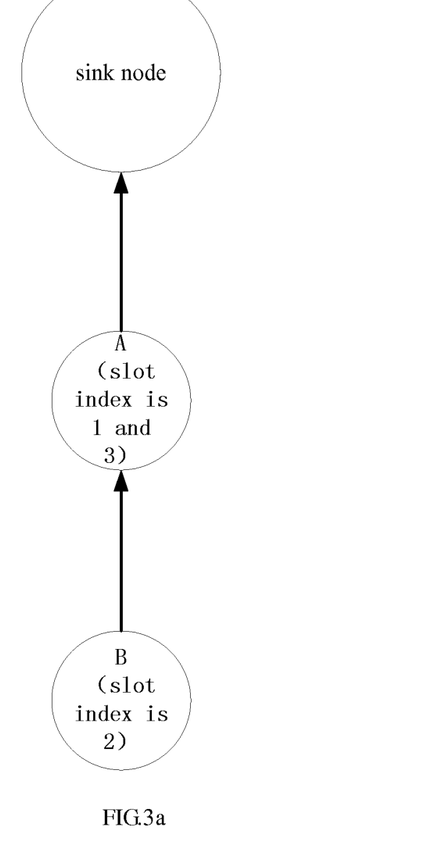
FIGS. 3a and 3b are schematic diagrams of two examples of slot allocation.
Figure 3B:
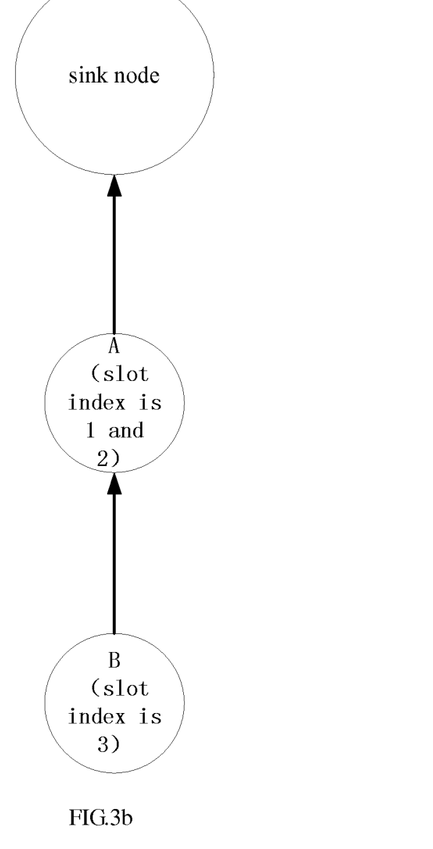

However, in the implementation of the present invention, the inventors found that for slot allocation of a node, a slot length and a slot sequence number (a slot index) need to be determined. An improper slot index will possibly result in relatively long time delay. As shown in FIGS. 3a and 3b, nodes A and B have a data packet respectively, and a slot allocation scheme shown in FIG. 3a and a slot allocation scheme shown in FIG. 3b have identical slot lengths, that is, two slots are allocated to the node A and one slot is allocated to the node B. In the slot allocation scheme shown in FIG. 3a, SINK (sink node) may collect all the data packets by using three slots, but in the slot allocation scheme shown in FIG. 3b, it is impossible to complete the collection within three slots, and more than three slots are needed.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A main object of embodiments of the present invention is to provide a stepwise slot allocation method and apparatus, so as to solve the problem mentioned in the Background by scheduling a proper slot index for each node with a distributed stepwise method.

According to a first aspect of the embodiments of the present invention, there is provided a stepwise slot allocation method, the method is applicable to a node in a wireless network and includes:

determining by the node an initial boundary value of a slot for slot allocation at a current slot allocation stage;

calculating by the node a slot length needed by the node at the current slot allocation stage; and selecting by the node a slot index needed by the current slot allocation stage starting from the initial boundary value.

According to a second aspect of the embodiments of the present invention, there is provided a node in a wireless network, including:

a determining unit configured to determine an initial boundary value of a slot for slot allocation at a current slot allocation stage;

a calculating unit configured to calculate a slot length needed by the node at the current slot allocation stage; and a selecting unit configured to select a slot index needed by the current slot allocation stage starting from the initial boundary value.

According to a further aspect of the embodiments of the present invention, there is provided a wireless network, including at least one node as described in the second aspect, or including at least one arbitrary combination of the nodes as described in the second aspect.

An advantage of the embodiments of the present invention resides in that by dividing a whole slot allocation process into several stages, proper slot allocation is performed to each node by determining a slot length and a slot index needed by each node in transmitting a data packet in each stage, thereby solving the problem mentioned in the Background.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are described herein to provide further understanding of the embodiments of the present invention, which constitute a part of this application, illustrate modes of implementation of the present invention, and explain principles of the present invention together with literal description. It is obvious that accompanying drawings in the following description are some the embodiments of the present invention, and to those skilled in the art, other accompanying drawings may be obtained according to these accompanying drawings without making an inventive effort. In the drawings.

DETAILED DESCRIPTION

Various embodiments of the present invention are described as follows with reference to the drawings. These embodiments are illustrative only, and are not intended to limit the present invention. For the principle and implementation modes of the present invention to be easily understood by those skilled in the art, the implementation modes of the present invention shall be described taking a stepwise slot allocation method in a wireless network as an example. However, it should be understood that the embodiments of the present invention are not limited thereto, and are applicable to other networks related to stepwise slot allocation, such as an ad hoc network, and a smart power grid, etc. That is, the slot allocation method of the embodiments of the present invention may be applicable to a network with full connected tree topology, and it is up to a routing algorithm to decide on which path a data packet will be transferred to the SINK ("Root").

For more clarity and easy understanding of the method of the embodiments of the present invention, some concepts concerned in the embodiments of the present invention shall be explained below first.

In the embodiments of the present invention, SINK (sink node) refers to a unique target node of all routes.

In the embodiments of the present invention, each node has only one route reaching the SINK. For one node in the route, those nodes below this node in a tree structure (in a direction away from the SINK) are referred to as child nodes. A node having zero child node in the tree structure is referred to as a leaf node, and a node having at least one child node in the tree structure is referred to as a parent node, relative to the child node. And one node has at most one parent node.

In the embodiments of the present invention, a subtree taking one node as a root includes the node and all its child nodes. In other words, each node in the tree structure may be deemed as a root node of a subtree. And if some nodes have the same parent node and the same hop count, these nodes are in the same level.

In the embodiments of the present invention, a depth of a subtree is a length (the number of nodes involved in the route) of a maximum route downward routed from the root node of the subtree to a leaf node. For the sake of simplicity, a depth of a subtree taking a node X as a root is referred to as a depth of the node X. A depth of a SINK node is a depth of whole tree structure. And a depth of a leaf node is 1.

Figure 4:
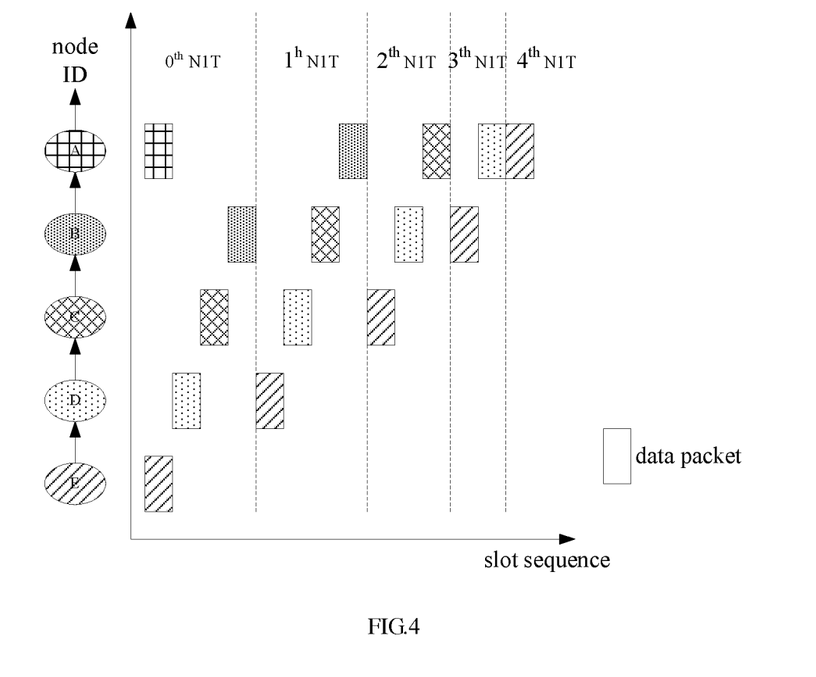
FIG. 4 is a schematic diagram of slot allocation of each N1T (node-1hop-transmission) of each node.

In the embodiments of the present invention, in order that the SINK in the tree topology receives all the data packets, each node needs to transmit upward data packets of its own or forward data packets of other nodes step by step according to an established route. Each node transmits data packets generated by itself or by the child nodes in the same level to its one-hop parent node, such transmission being denoted as "node 1-hop transmission (N1T)". For one data packet transmitted along a path, each node in the path requires at least one N1T opportunity. Assuming that each node is configured with only one data traffic, as shown in the topology structure of FIG. 4, the node A needs at least five N1T opportunities (a $0^{th}$ to a $4^{th}$) to finish transmission of all the data packets. The number of N1Ts needed by one node equals to the depth of the node. In the embodiments of the present invention, it can be seen from FIG. 4 that such a manner of slot index scheduling is more appropriate, that is, one slot index corresponds to one data packet, and such a manner of slot index scheduling may be carried out by using the slot allocation method of the embodiments of the present invention, hence, the case shown in FIG. 3b will not occur.

Figure 5A:
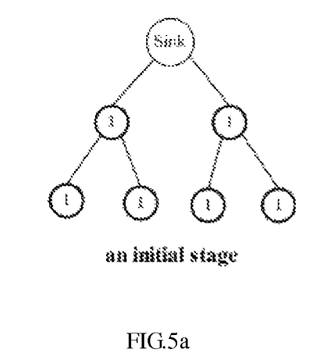
FIGS. 5a to 5c are schematic diagrams of packet transmission processes of each node.
Figures 5B, 5C:
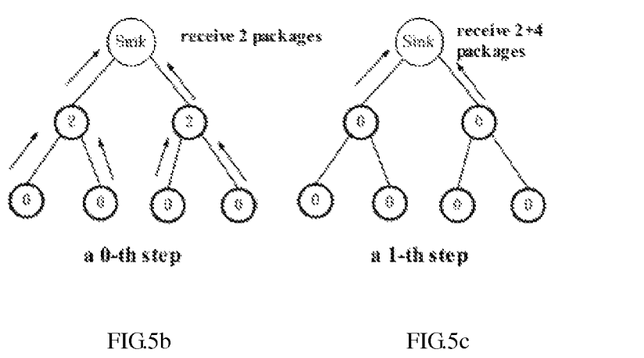

Taking data forwarding processes of the nodes shown in FIGS. 5a to 5c as examples. In an initial stage, as shown in FIG. 5a, each node itself has a data packet; at a 0-th step, as shown in FIG. 5b, each node transmits upwards the data packet of its own; and at an i-th step (i>0), as shown in FIG. 5c, each node forwards upwards data packets of all other nodes received by it at the previous step. In the embodiments of the present invention, for the sake of convenient explanation, the i-th step (i≥0) is referred to as one-hop transmission of an i-th node, and is also referred to as an i-th stage.

Embodiment 1

Figure 6:
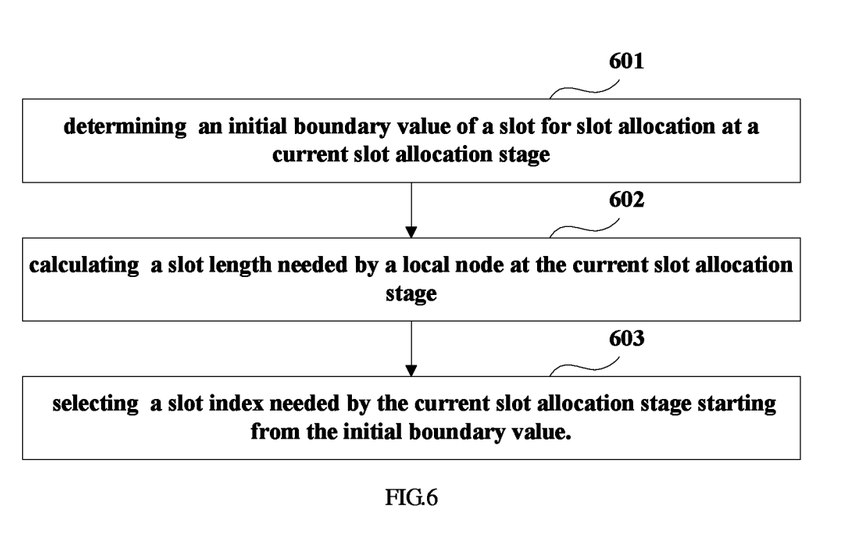
FIG. 6 is a flowchart of a slot allocation method of an embodiment of the present invention.

An embodiment of the present invention provides a stepwise slot allocation method, the method is applicable to a node in a wireless network. FIG. 6 is a flowchart of the method. Referring to FIG. 6, the method includes:

step 601: determining by the node an initial boundary value of a slot for slot allocation at a current slot allocation stage;

step 602: calculating by the node a slot length needed by the node at the current slot allocation stage; and step 603: selecting by the node a slot index needed by the current slot allocation stage starting from the initial boundary value.

In this embodiment, a whole slot allocation process may be completed step by step. For one node, slot allocation at an (n+1)-th N1T stage is started after slot allocation at an n-th N1T stage is completed. This means that the slot allocation at the (n+1)-th N1T stage is based on a result of the slot allocation at the n-th N1T stage. For one node in one N1T stage, the slot allocation is completed by using information of neighboring nodes of this node according to the method of this embodiment. Wherein, the neighboring nodes here may be nodes within a collision domain of this node, that is, nodes not more than h hops away from this node, h being predefined; however, this embodiment is not limited thereto. Wherein, a concept of the collision domain is known in the art, which shall not be described herein any further. In an implementation mode, the whole slot allocation process may be completed synchronously, which shall be described below in detail.

In this embodiment, in order to complete the slot allocation at the (n+1)-th N1T stage after the slot allocation at the n-th N1T stage is completed, for each node, it is needed to determine when the slot allocation at the (n+1)-th N1T stage is started. In this embodiment, the basic principle is that EndN1T(n)$_i$ for a local node (denoted by "i") should have been convergent and changeless before the slot allocation at the (n+1)-th N1T stage is started. EndN1T(n)$_i$ is the index of the last slot reserved by the node i and its neighboring nodes (not more than h hops away) in the slot allocation at the n-th N1T stage, that is, a maximum slot index. EndN1T(n)$_i$ can be calculated by the node i according to slot information of itself and its neighboring nodes (not more than h hops away). As to an opportunity of slot allocation at the n-th N1T stage (n=0), it may be determined following an existing policy according to an actual scheduling situation, and this embodiment is not limited thereto.

In this embodiment, for slot allocation at each N1T stage (referred to as a slot allocation stage or stage, for the convenience of explanation), it may be performed according to the method shown in FIG. 6.

In step 601, the local node needs first to determine the initial boundary value of the slot for slot allocation at the current slot allocation stage, that is, an index of a start slot at the current slot allocation stage.

In an implementation mode of this embodiment, the initial boundary value may be determined according to pre-configuration. For example, the system may pre-configure initial boundary values of the slots for slot allocation at each stage, e.g. an initial boundary value at a 0-th stage is 0, an initial boundary value at a first stage is 1001, an initial boundary value at a second stage is 2001, and so on. Hence, the initial boundary value may be determined according to the predetermined configuration only if the node can confirm the slot allocation stage where it is. As this implementation mode is not based on the slot information of the previous N1T stage, if the number of slots needed at each N1T stage is known, slots may be reserved at each N1T stage simultaneously, hence, the slot allocation in this implementation mode does not need to be performed step by step.

In another implementation mode of this embodiment, the initial boundary value may be determined according to an index of an ending slot of a previous slot allocation stage. If the current stage is the initial stage (the 0-th stage), that is, no previous slot allocation stage exists, the initial boundary value of the initial stage may be predetermined, which may be predetermined as 0 or other values, as described above, and this embodiment is not limited thereto.

In this implementation mode, the node may determine the index of the ending slot of the previous slot allocation stage first, and then take the index of the ending slot of the previous slot allocation stage plus a predetermined value as the initial boundary value of the slots for slot allocation at the current slot allocation stage. Wherein, the index of the ending slot of the previous slot allocation stage refers to a maximum slot index in the slots reserved by the node and neighboring nodes within its predetermined range at the previous slot allocation stage. The maximum slot index may be calculated and stored by the node at the previous slot allocation stage, hence, the node may determine at the current slot allocation stage the index of the ending slot of the previous slot allocation stage.

For example, the initial boundary value of the slot for slot allocation at the current slot allocation stage is denoted by StartN1T(n+1)$_i$, and the index of the ending slot of the previous slot allocation stage is denoted by EndN1T(n)$_i$, StartN1T(n+1)$_i$=EndN1T(n)$_i$+m; where, m is a predetermined value, which may be 1. EndN1T(n)$_i$ may be calculated by the node i according to slot information of itself and its neighboring slots (not more than h hops away), that is, EndN1T(n)$_i$=MaxN1T(n)$_i$, i.e. the ending slot is a maximum slot in the slots reserved by the node i and its neighboring slots (not more than h hops away) at the n-th N1T stage.

In step 602, if the current slot allocation stage is not a first slot allocation stage, the node may first determine numbers of slots reserved respectively by all child nodes within its one-hop range at the previous slot allocation stage in calculating a needed slot length at the current slot allocation stage, and then take a sum of the numbers of the slots reserved respectively by all the child nodes within its one-hop range at the previous slot allocation stage as the needed slot length at the current slot allocation stage. Wherein, the numbers of the slots reserved respectively by all the child nodes within its one-hop range at the previous slot allocation stage may be determined through calculation. For example, the node calculates the numbers of the slots reserved respectively by all the child nodes within its one-hop range at the previous slot allocation stage after the slot allocation at the previous slot allocation stage is completed.

For example, Len(n+1)$_i$=Rx_slot(n)$_i$. Assuming that the node i has k child nodes needing to reserve slots at the n-th N1T stage, and each of the k child nodes reserves $I_{jn}$ (j=1, 2, . . . , k) slots at the n-th N1T stage, then $$Rx\_slot(n)_i = \sum_{j=1}^{k} 1_{jn}.$$

In step 602, if the current slot allocation stage is the first slot allocation stage, the node may determine its needed slot length at the current slot allocation stage according to the number of the data packets to be transmitted by it in calculating a needed slot length at the current slot allocation stage. That is, for the first slot allocation stage, there exist no other nodes transmitting data packets to the local node, and it is not needed to forward these data packets for these nodes. Therefore, the node needs only to determine the needed slot length according to the number of the data packets of itself. For example, if it generates three data packets, three slots need only to be reserved, thereby determining that its needed slot length at the current slot allocation stage is 3.

In step 603, in order to select a slot index needed at the current slot allocation stage starting from the initial boundary value, a basic principle as follows should be satisfied, that is, a slot reserved by the local node should not collide with the slots reserved by the neighboring nodes h hops away from it.

Figure 7:
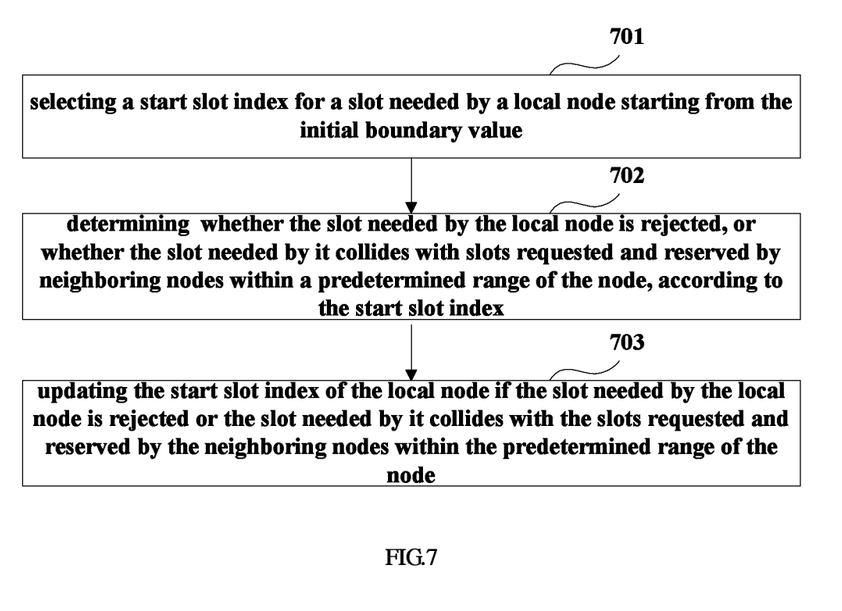
FIG. 7 is a flowchart of a method for selecting a slot index needed by a current slot allocation stage of an embodiment of the present invention.

FIG. 7 is a flowchart of a method for selecting a slot index needed at a current slot allocation stage by the node. Referring to FIG. 7, the method includes:

step 701: selecting a start slot index by the node for a slot needed by it starting from the initial boundary value;

wherein, the node may take a first idle slot as its start slot starting from the initial boundary value, and may also select the start slot starting from the initial boundary value according to other policies; for example, determining an ending boundary value, and selecting the start slot within a range of the initial boundary value and the ending boundary value, etc., thereby obtaining the start slot index;

step 702: determining by the node whether the slot needed by it is rejected, or whether the slot needed by it collides with slots requested and reserved by neighboring nodes within a predetermined range of the node, according to the start slot index;

wherein, when the start slot is selected, the node may determine all needed slots according to the previously determined needed slot length, so as to determine indices of all the needed slots, thereby determining whether the slot needed by it is rejected, or whether the slot needed by it collides with slots requested and reserved by neighboring nodes in a predetermined range of the node; of course, this embodiment is not limited thereto; and in other embodiments, if slots reserved by a node is consecutive, the node may determine whether the slots needed by it collide with slots requested and reserved by neighboring nodes within a predetermined range of the node according only to the previously determined needed slot length and the previously determined start slot index;

wherein, a manner of determining whether the slot needed by the node is rejected or whether the slot needed by the node collides with slots requested and reserved by neighboring nodes within a predetermined range of the node shall be described below;

step 703: updating the start slot index of the node by the node if the slot needed by the node is rejected or the slot needed by it collides with the slots requested and reserved by the neighboring nodes within the predetermined range of the node;

wherein, when the slot needed by the node is rejected or the slot needed by it collides with the slots requested and reserved by the neighboring nodes within the predetermined range of the node, it shows that the node may not use the previously determined needed slots to transmit data, and at this moment, it is needed to update its needed slot starting from the start slot;

on the other hand, if the slot needed by the node is not rejected or the slot needed by the node does not collide with the slots requested and reserved by the neighboring nodes within the predetermined range of the node, the node takes the previously determined needed slot as the slot reserved by it, thereby determining the slot index needed at the current slot allocation stage.

In step 702, the node may determine whether the slot needed by it is rejected by transmitting slot request acknowledgement information including the slot needed by it to the neighboring nodes within the predetermined range of the node. If the node receives slot request rejection information fed back by the neighboring nodes, the node determines that the slot needed by it is rejected. On the contrary, if the neighboring nodes agree, the neighboring nodes may feed back slot request acknowledgement information, and may not feed back any information. At this moment, if the node receives the slot request acknowledgement information fed back by the neighboring nodes or receives no information in a predetermined period of time, the node determines that the slot needed by it is accepted.

In step 702, the node may determine whether the slot needed by it collides with the slots requested and reserved by the neighboring nodes within the predetermined range of the node by receiving slot request acknowledgement information including slots needed by the neighboring nodes transmitted by the neighboring nodes in the predetermined range of the node. If a slot index of at least one of the slots needed by the node is identical to a index of the slots requested and reserved by the neighboring nodes within the predetermined range of the node, it is determined that the slot needed by the node collides with the slots requested and reserved by the neighboring nodes in the predetermined range of the node.

In this embodiment, when slots reserved by two nodes collide, which node backs off may be determined according to a node priority, or may be back off randomly. The node priority here may be node ID, and may also be a slot length needed by a node at the current slot allocation stage. For example, a node with small node ID backs off, or a node with a relatively small slot length needed by it at the current slot allocation stage backs off. In this implementation mode, in determining whether the slot needed by the node collides with the slots requested and reserved by the neighboring nodes in the predetermined range of the node, not only whether the slot indices are identical but also the priorities are taken into account. For example, if the slot indices are identical, but the priority of the node is higher than the priorities of the neighboring nodes, it is determined that they do not collide; otherwise, if the slot indices are identical, but the priority of the node is lower than the priorities of the neighboring nodes, it is determined that they collide. The random backoff here refers to that for two nodes A and B that collide to each other, it is not specified that the node A or B backs off according to a predetermined priorities of the node A and B, but the node A or B independently backs off respectively by a random number of slot lengths.

In this embodiment, a node needing to back off may back off based on slot index information of a collision node, and may also back off randomly. The former refers to that when the slot of node A with a lower priority imposes collision on the slot of node B with a higher priority, the node A with a lower priority backs off to behind the maximum slot index of the node B with a higher priority; and the latter refers to that the node A may back off by a random number of slot lengths, so as to finally achieve no collision on the node B.

For more clear and easy understanding of the method of determining a start slot of the embodiment of the present invention, it shall be described below by way of an example.

It is assumed that which node backs off is dependent on the priority of the node, the priority here being denoted by a value of node ID, and the smaller the node ID, the lower the priority. An index at an N1T stage is n, a local node is denoted by i, and a start slot of the node i in slot allocation at an n-th N1T stage is denoted by $StartSlot(n)_i$.

A procedure for calculating $StartSlot(n)_i$ always occurs before an HELLO packet broadcasting, and is shown as follows:

temp=$StartSlot(n)_i$, that is, a temporary folder is the start slot;

$StartSlot(n)_i$=$StartN1T(n)_i$, that is, the start slot is an initial value of a boundary value at this stage;

j=1, that is, for a first neighbor;

While j<=the number of nearby neighbors (no more than h hops away), that is, when j is less than or equal to the number of neighboring nodes (within an h-hop range);

check the j-th neighbor;

If the ID of the j-th neighbor is bigger than local node (i) ID;

$StartSlot(n)_i$=$StartSlot(n)_i$+slot length reserved by the j-th neighbor (back off), that is, the start slot is a sum of the start slot and a length of a slot reserved by the j-th neighbor;

END;

j=j+1, that is, a (j+1)-th neighbor is continued;

$StartSlot(n)_i$=max(temp, $StartSlot(n)_i$), that is, the start slot is a maximum value of the temporary folder and the start slot.

A result of the above embodiment may be explained by Table 1, which is information collected by a node $N_2$. Assuming that ID values satisfy $N_1<N_2<N_3<N_4<N_5<N_6$, then a start slot $StartSlot(n)_2$ of the $N_2$ shall back off to $StartN1T(n)_2+I_6+I_5+I_4+I_3$ at last.

TABLE 1

| Node ID | Start slot index | Length |
|---------|------------------|--------|
| $N_1$ | $S_1$ | $l_1$ |
| $N_3$ | $S_3$ | $l_3$ |
| $N_4$ | $S_4$ | $l_4$ |
| $N_5$ | $S_5$ | $l_5$ |
| $N_6$ | $S_6$ | $l_6$ |

In this embodiment, as described above, for facilitating determination of the initial boundary value at a next slot allocation stage, in the current allocation stage, the node may further calculate an ending slot of the current slot allocation stage. As described above, the ending slot of the current slot allocation stage is a maximum slot index in slots reserved by the node and neighboring nodes within the predetermined range of the node at the current slot allocation stage.

In this embodiment, as described above, for facilitating determination of the needed slot length (i.e. the number of slots) at a next slot allocation stage, in the current allocation stage, the node may further calculate a total number of slots needing to be reserved by the node at the next slot allocation stage. As described above, the total number of slots needing to be reserved by the node at the next slot allocation stage is a sum of numbers of slots reserved respectively by all the child nodes within the one-hop range of the node at the current slot allocation stage.

Figure 8:
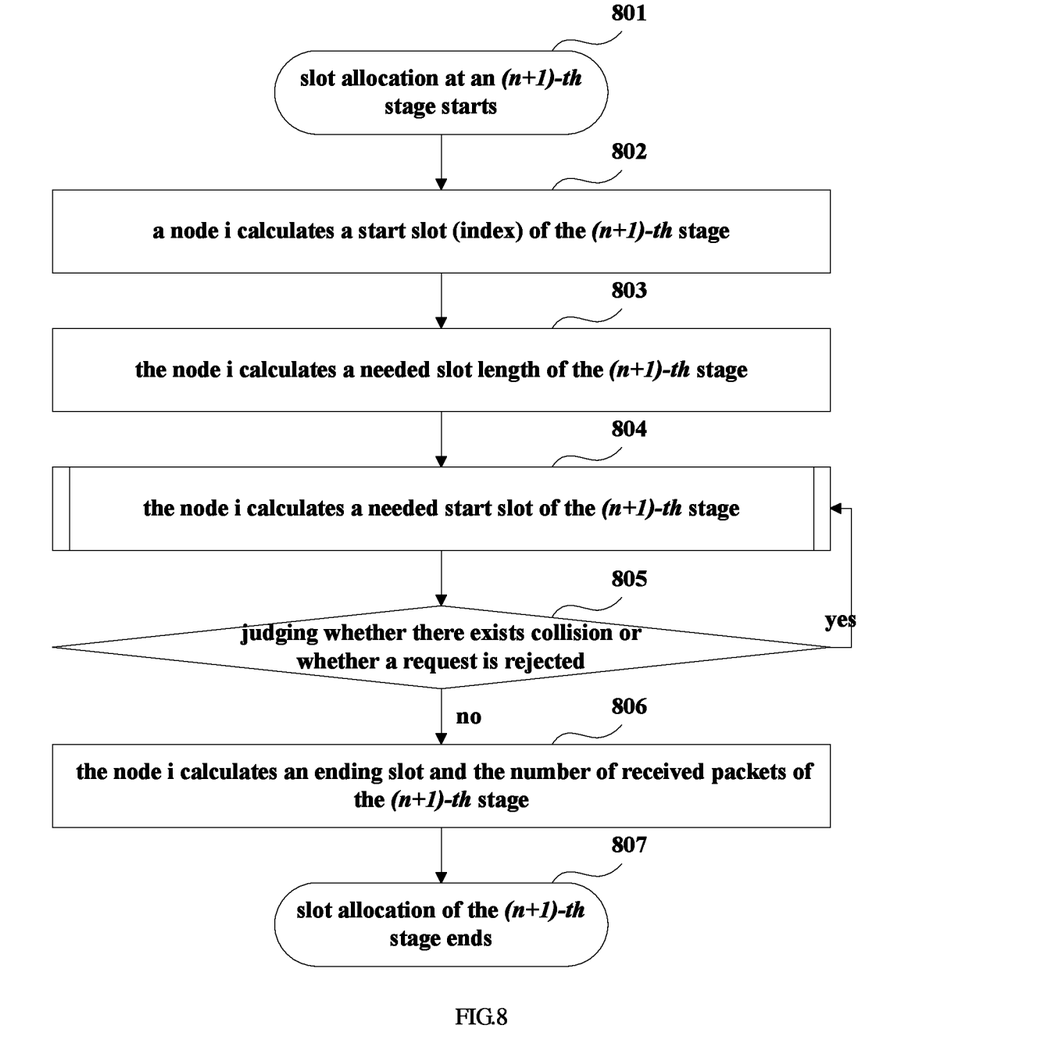
FIG. 8 is a flowchart of slot allocation performed at an n+1 stage according to the method of the embodiment of the present invention.

FIG. 8 is a flowchart of a preferred implementation mode of a slot allocation method according to the method of the embodiment. However, this embodiment is not limited to the steps of the implementation mode shown in FIG. 8. As described above, in some implementation modes, some steps shown in FIG. 8 may be omitted or replaced. And in some implementation modes, besides the steps shown in FIG. 8, some other steps may be added. Hence, the steps shown in FIG. 8 do not constitute limitation to the embodiment of the present invention.

As shown in FIG. 8, the method includes:

step 801: slot allocation at an (n+1)-th stage starts;

step 802: a node i calculates a start slot (index) at the (n+1)-th stage, $StartN1T(n+1)_i = EndN1T(n)_i + m$;

wherein, the start slot (index) at the (n+1)-th stage being an ending slot at an n-th stage plus m is taken as an example, m may be equal to 1; however, as described above, this embodiment is not limited thereto;

step 803: the node i calculates a needed slot length at the (n+1)-th stage, $Len(n+1)_i = Rx\_slot(n)_i$;

wherein, the needed slot length at the (n+1)-th stage being the number of received packets at the n-th stage is taken as an example; however, as described above, this embodiment is not limited thereto;

step 804: the node i calculates a needed start slot at the (n+1)-th stage, $start(n+1)_i$;

wherein, a particular determination method is not limited in this embodiment, an existing method may be employed, and as the development of technologies, other methods may be employed, only if that a selection range starting from $StartN1T(n+1)_1$ described in step 802 is ensured;

step 805: judging whether there exists collision or whether a request is rejected; turning back to step 804 if yes; otherwise, executing step 806;

wherein, a particular method of judging whether there exists collision or whether a request is rejected is not limited in this embodiment, existing judgment means may be applicable to the judgment in step 805 after reasonable transform, and this embodiment is not limited thereto;

step 806: the node i calculates an ending slot ($EndN1T(n+1)_i$) and the number of received packets ($Rx\_slot(n+1)_i$) at the (n+1)-th stage;

wherein, as described above, for reasonable slot selection at a subsequent (n+2)-th stage, the ending slot and the number of the received packets may be calculated at the (n+1)-th stage, the ending slot being used for determining a start slot ($StartN1T(n+2)_i$) at the (n+2)-th stage, and the number of the received packets being used for determining a needed slot length $Len(n+2)_i$ at the (n+2)-th stage; of course, this step is optional;

step 807: slot allocation at the (n+1)-th stage ends.

With the method of the embodiment of the present invention, the slot allocation is combined with an amount of traffics in the network, so that a slot index of each node is more proper. This ensures that one packet corresponds to one slot, and a case will not occur where a slot is reserved but not used. Furthermore, in comparison with most existing methods, the total number of slots used in the process of collecting all the packets by the sink node is fewer.

An embodiment of the present invention further provides a node, as described in Embodiment 2 below. As the principle of the node for solving problems is similar to that of the method of Embodiment 1, the implementation of the method of Embodiment 1 may be referred to for the implementation of the node, and the identical contents shall not be described any further.

Embodiment 2

Figure 9:
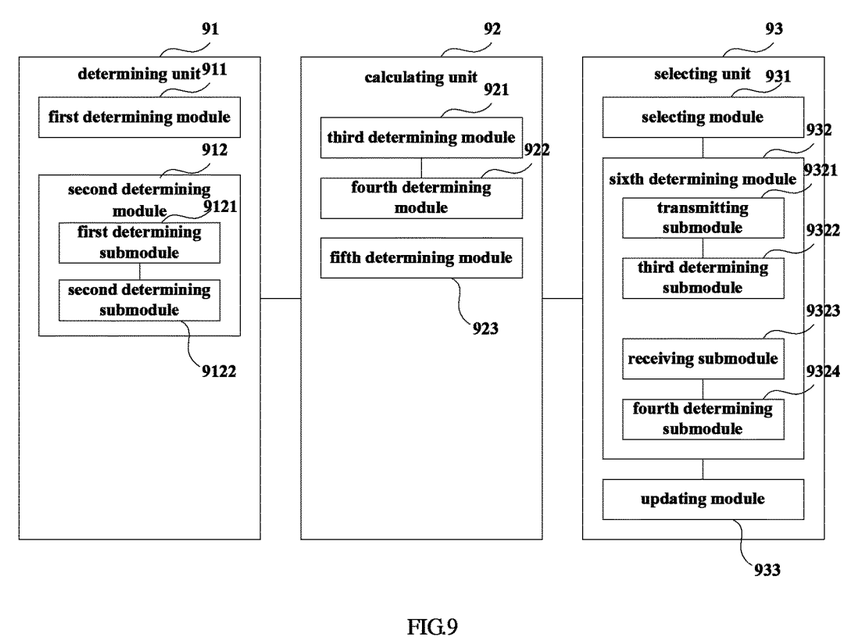
FIG. 9 is a schematic diagram of the structure of a node of an embodiment of the present invention.

An embodiment of the present invention provides a node. In an implementation mode, the node is one in a wireless network; however, this embodiment is not limited thereto. FIG. 9 is a schematic diagram of the structure of the node. Referring to FIG. 9, the node includes:

a determining unit 91 configured to determine an initial boundary value of a slot for slot allocation at a current slot allocation stage;

a calculating unit 92 configured to calculate a slot length needed by the node at the current slot allocation stage; and a selecting unit 93 configured to select a slot index needed by the current slot allocation stage starting from the initial boundary value.

In an implementation mode of this embodiment, the determining unit 91 may include:

a first determining module 911 configured to determine the initial boundary value of the slot for slot allocation at the current slot allocation stage according to predetermined configuration.

In another implementation mode of this embodiment, the determining unit 91 may include:

a second determining module 912 configured to determine the initial boundary value of the slot for slot allocation at the current slot allocation stage according to an index of an ending slot of a previous slot allocation stage.

In this implementation mode, the second determining module 912 may include:

a first determining submodule 9121 configured to determine the index of the ending slot of the previous slot allocation stage; and a second determining submodule 9122 configured to take the index of the ending slot of the previous slot allocation stage plus a predetermined value as the initial boundary value of the slot for slot allocation at the current slot allocation stage.

Wherein, the index of the ending slot of the previous slot allocation stage is a maximum slot index in slots reserved at the previous slot allocation stage by the node and neighboring nodes within a predetermined range of the node.

In an implementation mode of this embodiment, the calculating unit 92 may include:

a third determining module 921 configured to determine the numbers of slots respectively reserved at the previous slot allocation stage by all child nodes within a one-hop range of the node when the current slot allocation stage is not a first slot allocation stage; and a fourth determining module 922 configured to take a sum of the numbers of slots respectively reserved at the previous slot allocation stage by all the child nodes within the one-hop range of the node as the slot length needed by the node at the current slot allocation stage.

In an implementation mode of this embodiment, the calculating unit 92 may include:

a fifth determining module 923 configured to determine the slot length needed by the node at the current slot allocation stage according to the number of data packets needing to be transmitted by the node when the current slot allocation stage is a first slot allocation stage.

In an implementation mode of this embodiment, the selecting unit 93 may include:

a selecting module 931 configured to select a start slot index for a slot needed by the node starting from the initial boundary value;

a sixth determining module 932 configured to determine whether the slot needed by the node is rejected, or whether the slot needed by the node collides with slots requested and reserved by neighboring nodes within a predetermined range of the node, according to the start slot index; and an updating module 933 configured to update the start slot index of the node when the slot needed by the node is rejected or the slot needed by the node collides with the slots requested and reserved by the neighboring nodes within the predetermined range of the node.

In this implementation mode, the sixth determining module 932 may include: a transmitting submodule 9321 and a third determining submodule 9322, and/or a receiving submodule 9323 and a fourth determining submodule 9324.

The transmitting submodule 9321 is configured to transmit slot request acknowledgement information including the slot needed by the node to the neighboring nodes within the predetermined range of the node;

the third determining submodule 9322 is configured to determine that the slot needed by the node is rejected when the node receives slot request rejection information fed back by the neighboring nodes;

the receiving submodule 9323 is configured to receive slot request acknowledgement information including slots needed by the neighboring nodes transmitted by the neighboring nodes within the predetermined range of the node; and the fourth determining submodule 9324 is configured to determine that the slot needed by the node collides with the slots requested and reserved by the neighboring nodes within the predetermined range of the node when at least one slot index of the slot needed by the node is identical to a slot index of the slots requested and reserved by the neighboring nodes within the predetermined range of the node and a priority of the node is lower than that of the neighboring nodes.

In other implementation modes of this embodiment, the calculating unit 92 may further be configured to calculate an ending slot of the current slot allocation stage, and/or to calculate a total number of slots needing to be reserved by the node at a next slot allocation stage. Wherein, the ending slot of the current slot allocation stage is a maximum slot index in slots reserved at the current slot allocation stage by the node and neighboring nodes within a predetermined range of the node. Wherein, the total number of slots needing to be reserved by the node at the next slot allocation stage is a sum of the numbers of slots reserved respectively by all child nodes within a one-hop range of the node at the current slot allocation stage.

With the node of the embodiment of the present invention, the slot allocation is combined with an amount of traffics in the network, so that a slot index of each node is more proper. This ensures that one packet corresponds to one slot, and a case will not occur where a slot is reserved but not used. Furthermore, in comparison with most existing methods, the total number of slots used in the process of collecting all the packets by the sink node is fewer.

An embodiment of the present invention further provides a wireless network, including at least one node as described in Embodiment 2, or including at least one arbitrary combination of the nodes as described in Embodiment 2.

The above apparatus and method of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

For the implementation containing the above embodiments, following supplements are further disclosed.

Supplement 1. A stepwise slot allocation method, applicable to a node in a wireless network; wherein the method includes:

determining by the node an initial boundary value of a slot for slot allocation at a current slot allocation stage;

calculating by the node a slot length needed by the node at the current slot allocation stage; and selecting by the node a slot index needed by the current slot allocation stage starting from the initial boundary value.

Supplement 2. The method according to supplement 1, wherein the step of determining by the node an initial boundary value of a slot for slot allocation at a current slot allocation stage includes:

determining the initial boundary value of the slot for slot allocation at the current slot allocation stage by the node according to predetermined configuration; or determining the initial boundary value of the slot for slot allocation at the current slot allocation stage by the node according to an index of an ending slot of a previous slot allocation stage.

Supplement 3. The method according to supplement 2, wherein the step of determining the initial boundary value of the slot for slot allocation at the current slot allocation stage by the node according to an index of an ending slot of a previous slot allocation stage includes:

determining the index of the ending slot of the previous slot allocation stage by the node; and taking the index of the ending slot of the previous slot allocation stage plus a predetermined value by the node as the initial boundary value of the slot for slot allocation at the current slot allocation stage.

Supplement 4. The method according to supplement 3, wherein the index of the ending slot of the previous slot allocation stage is a maximum slot index in slots reserved at the previous slot allocation stage by the node and neighboring nodes within a predetermined range of the node.

Supplement 5. The method according to supplement 1, wherein if the current slot allocation stage is not a first slot allocation stage, the step of calculating by the node a slot length needed by the node at the current slot allocation stage includes:

determining by the node the numbers of slots respectively reserved at the previous slot allocation stage by all child nodes within a one-hop range of the node; and taking by the node a sum of the numbers of slots respectively reserved at the previous slot allocation stage by all the child nodes within the one-hop range of the node as the slot length needed by the node at the current slot allocation stage.

Supplement 6. The method according to supplement 1, wherein if the current slot allocation stage is a first slot allocation stage, the step of calculating by the node a slot length needed by the node at the current slot allocation stage includes:

determining by the node the slot length needed by the node at the current slot allocation stage according to the number of data packets needing to be transmitted by the node.

Supplement 7. The method according to supplement 1, wherein the step of selecting by the node a slot index needed by the current slot allocation stage starting from the initial boundary value includes:

selecting by the node a start slot index for a slot needed by the node starting from the initial boundary value;

determining by the node whether the slot needed by the node is rejected, or whether the slot needed by the node collides with slots requested and reserved by neighboring nodes within a predetermined range of the node, according to the start slot index; and updating by the node the start slot index of the node if the slot needed by the node is rejected or the slot needed by the node collides with the slots requested and reserved by the neighboring nodes within the predetermined range of the node.

Supplement 8. The method according to supplement 7, wherein the step of determining whether the slot needed by the node is rejected includes:

transmitting by the node slot request acknowledgement information including the slot needed by the node to the neighboring nodes within the predetermined range of the node; and determining that the slot needed by the node is rejected if the node receives slot request rejection information fed back by the neighboring nodes.

Supplement 9. The method according to supplement 7, wherein the step of determining whether the slot needed by the node collides with slots requested and reserved by neighboring nodes within a predetermined range of the node includes:

receiving by the node slot request acknowledgement information including slots needed by the neighboring nodes transmitted by the neighboring nodes within the predetermined range of the node; and determining that the slot needed by the node collides with the slots requested and reserved by the neighboring nodes within the predetermined range of the node if a slot index of at least one of the slots needed by the node is identical to a slot index of the slots requested and reserved by the neighboring nodes within the predetermined range of the node and a priority of the node is lower than that of the neighboring nodes.

Supplement 10. The method according to supplement 9, wherein the priority is node ID or the slot length needed at the current slot allocation stage.

Supplement 11. The method according to supplement 1, wherein the method further includes:

calculating by the node an ending slot of the current slot allocation stage; and/or calculating by the node a total number of slots needing to be reserved by the node at a next slot allocation stage.

Supplement 12. The method according to supplement 11, wherein the ending slot of the current slot allocation stage is a maximum slot index in slots reserved at the current slot allocation stage by the node and neighboring nodes within a predetermined range of the node.

Supplement 13. The method according to supplement 11, wherein the total number of slots needing to be reserved by the node at the next slot allocation stage is a sum of the numbers of slots reserved respectively by all child nodes within a one-hop range of the node at the current slot allocation stage.

Supplement 14. A node in a wireless network, including:

a determining unit configured to determine an initial boundary value of a slot for slot allocation at a current slot allocation stage;

a calculating unit configured to calculate a slot length needed by the node at the current slot allocation stage; and a selecting unit configured to select a slot index needed by the current slot allocation stage starting from the initial boundary value.

Supplement 15. The node according to supplement 14, wherein the determining unit includes:

a first determining module configured to determine the initial boundary value of the slot for slot allocation at the current slot allocation stage according to predetermined configuration; or a second determining module configured to determine the initial boundary value of the slot for slot allocation at the current slot allocation stage according to an index of an ending slot of a previous slot allocation stage.

Supplement 16. The node according to supplement 15, wherein the second determining module includes:

a first determining submodule configured to determine the index of the ending slot of the previous slot allocation stage; and a second determining submodule configured to take the index of the ending slot of the previous slot allocation stage plus a predetermined value as the initial boundary value of the slot for slot allocation at the current slot allocation stage.

Supplement 17. The node according to supplement 16, wherein the index of the ending slot of the previous slot allocation stage is a maximum slot index in slots reserved at the previous slot allocation stage by the node and neighboring nodes within a predetermined range of the node.

Supplement 18. The node according to supplement 14, wherein the calculating unit includes:

a third determining module configured to determine the numbers of slots respectively reserved at the previous slot allocation stage by all child nodes within a one-hop range of the node when the current slot allocation stage is not a first slot allocation stage; and a fourth determining module configured to take a sum of the numbers of slots respectively reserved at the previous slot allocation stage by all the child nodes within the one-hop range of the node as the slot length needed by the node at the current slot allocation stage.

Supplement 19. The node according to supplement 14, wherein the calculating unit includes:

a fifth determining module configured to determine the slot length needed by the node at the current slot allocation stage according to the number of data packets needing to be transmitted by the node when the current slot allocation stage is a first slot allocation stage.

Supplement 20. The node according to supplement 14, wherein the selecting unit includes:

a selecting module configured to select a start slot index for a slot needed by the node starting from the initial boundary value;

a sixth determining module configured to determine whether the slot needed by the node is rejected, or whether the slot needed by the node collides with slots requested and reserved by neighboring nodes within a predetermined range of the node, according to the start slot index; and an updating module configured to update the start slot index of the node when the slot needed by the node is rejected or the slot needed by the node collides with the slots requested and reserved by the neighboring nodes within the predetermined range of the node.

Supplement 21. The node according to supplement 20, wherein the sixth determining module includes:

a transmitting submodule configured to transmit slot request acknowledgement information including the slot needed by the node to the neighboring nodes within the predetermined range of the node; and a third determining submodule configured to determine that the slot needed by the node is rejected when the node receives slot request rejection information fed back by the neighboring nodes.

Supplement 22. The node according to supplement 20, wherein the sixth determining module includes:

a receiving submodule configured to receive slot request acknowledgement information including slots needed by the neighboring nodes transmitted by the neighboring nodes within the predetermined range of the node; and a fourth determining submodule configured to determine that the slot needed by the node collides with the slots requested and reserved by the neighboring nodes within the predetermined range of the node when a slot index of at least one of the slots needed by the node is identical to a slot index of the slots requested and reserved by the neighboring nodes within the predetermined range of the node and a priority of the node is lower than that of the neighboring nodes.

Supplement 23. The node according to supplement 22, wherein the priority is node ID or the slot length needed at the current slot allocation stage.

Supplement 24. The node according to supplement 14, wherein the calculating unit is further configured to calculate an ending slot of the current slot allocation stage; and/or calculate a total number of slots needing to be reserved by the node at a next slot allocation stage.

Supplement 25. The node according to supplement 24, wherein the ending slot of the current slot allocation stage is a maximum slot index in slots reserved at the current slot allocation stage by the node and neighboring nodes within a predetermined range of the node.

Supplement 26. The node according to supplement 24, wherein the total number of slots needing to be reserved by the node at the next slot allocation stage is a sum of slots the numbers of reserved respectively by all child nodes within a one-hop range of the node at the current slot allocation stage.

Supplement 27. A wireless network, including at least one node as described in any one of supplements 14-26, or including at least one arbitrary combination of the nodes as described in supplements 14-26.

The invention claimed is:

1. A node in a wireless network in which an entire slot allocation process is divided into several slot allocation stages, comprising:
   a memory; and
   a processor coupled to the memory and configured to:
      determine an initial boundary value of a slot for slot allocation at a current slot allocation stage;
      calculate the number of slots needed by the node at the current slot allocation stage; and
      select a slot index needed by the current slot allocation stage starting from the initial boundary value.

2. The node according to claim 1, wherein the processor is further configured to:
   determine the initial boundary value of the slot for slot allocation at the current slot allocation stage according to a predetermined configuration; and
   determine the initial boundary value of the slot for slot allocation at the current slot allocation stage according to an index of an endslot of a previous slot allocation stage.

3. The node according to claim 2, wherein the processor is further configured to:
   determine the index of the end slot of the previous slot allocation stage; and
   use the index of the end slot of the previous slot allocation stage plus a predetermined value as the initial boundary value of the slot for slot allocation at the current slot allocation stage.

4. The node according to claim 3, wherein the index of the end slot of the previous slot allocation stage is a maximum slot index among slots reserved at the previous slot allocation stage by the node and by neighboring nodes within a predetermined range of the node.

5. The node according to claim 1, wherein the processor is further configured to:
   determine numbers of slots respectively reserved at the previous slot allocation stage by all child nodes within a one-hop range of the node when the current slot allocation stage is not a first slot allocation stage; and
   use a sum of the numbers of slots respectively reserved at the previous slot allocation stage by all the child nodes within the one-hop range of the node as the number of slots needed by the node at the current slot allocation stage.

6. The node according to claim 1, wherein the processor is further configured to:
   determine the number of slots needed by the node at the current slot allocation stage according to a number of data packets needing to be transmitted by the node when the current slot allocation stage is a first slot allocation stage.

7. The node according to claim 1, wherein the processing is further configured to:

select a start slot index for a slot needed by the node starting from the initial boundary value;

determine one of whether the slot needed by the node is rejected, and whether the slot needed by the node collides with slots requested and reserved by neighboring nodes within a predetermined range of the node, according to the start slot index; and update the start slot index of the node when one of the slot needed by the node is rejected and the slot needed by the node collides with the slots requested and reserved by the neighboring nodes within the predetermined range of the node.

8. The node according to claim 7, wherein the processor is further configured to:

transmit slot request acknowledgement information comprising the slot needed by the node to the neighboring nodes within the predetermined range of the node; and determine that the slot needed by the node is rejected when the node receives slot request rejection information fed back by the neighboring nodes.

9. The node according to claim 7, wherein the processor is further configured to:

receive slot request acknowledgement information comprising slots needed by the neighboring nodes transmitted by the neighboring nodes within the predetermined range of the node; and determine that the slot needed by the node colliding with the slots requested and reserved by the neighboring nodes within the predetermined range of the node when a slot index of at least one of the slots needed by the node is identical to a slot index of the slots requested and reserved by the neighboring nodes within the predetermined range of the node and a priority of the node is lower than that of the neighboring nodes.

10. The node according to claim 9, wherein the priority is one of a node ID and the number of slots needed at the current slot allocation stage.

11. The node according to claim 1, wherein the processor is further configured to one of:

calculate an ending slot of the current slot allocation stage; and calculate a total number of slots needing to be reserved by the node at a next slot allocation stage.

12. The node according to claim 11, wherein an end slot of the current slot allocation stage is a maximum slot index in slots reserved at the current slot allocation stage by the node and neighboring nodes within a predetermined range of the node.

13. The node according to claim 11, wherein a total number of slots needing to be reserved by the node at the next slot allocation stage is a sum of slot numbers of slots reserved respectively by all child nodes within a one-hop range of the node at the current slot allocation stage.

14. A stepwise slot allocation method, applicable to a node in a wireless network in which an entire slot allocation process is divided into several slot allocation stages; wherein the method includes:

determining by the node an initial boundary value of a slot for slot allocation at a current slot allocation stage;

calculating by the node the number of slots needed by the node at the current slot allocation stage; and selecting by the node a slot index needed by the current slot allocation stage starting from the initial boundary value.

15. The method according to claim 14, wherein the determining by the node an initial boundary value of a slot for slot allocation at a current slot allocation stage includes:

determining the initial boundary value of the slot for slot allocation at the current slot allocation stage by the node according to a predetermined configuration; or determining the initial boundary value of the slot for slot allocation at the current slot allocation stage by the node according to an index of an end slot of a previous slot allocation stage.

16. The method according to claim 15, wherein the determining the initial boundary value of the slot for slot allocation at the current slot allocation stage by the node according to an index of an end slot of a previous slot allocation stage includes:

determining the index of the end slot of the previous slot allocation stage by the node; and using the index of the end slot of the previous slot allocation stage plus a predetermined value by the node as the initial boundary value of the slot for slot allocation at the current slot allocation stage;

wherein the index of the end slot of the previous slot allocation stage is a maximum slot index among slots reserved at the previous slot allocation stage by the node and neighboring nodes within a predetermined range of the node.

17. The method according to claim 14, wherein if the current slot allocation stage is not a first slot allocation stage, the calculating by the node the number of slots needed by the node at the current slot allocation stage includes:

determining by the node numbers of slots respectively reserved at the previous slot allocation stage by all child nodes within a one-hop range of the node; and using by the node a sum of the numbers of slots respectively reserved at the previous slot allocation stage by all child nodes within the one-hop range of the node as the number of slots needed by the node at the current slot allocation stage;

if the current slot allocation stage is a first slot allocation stage, the calculating by the node the number of slots needed by the node at the current slot allocation stage includes:

determining by the node the number of slots needed by the node at the current slot allocation stage according to a number of data packets needing to be transmitted by the node.

18. The method according to claim 14, wherein the selecting by the node a slot index needed by the current slot allocation stage starting from the initial boundary value includes:

selecting by the node a start slot index for a slot needed by the node starting from the initial boundary value;

determining by the node whether one of the slot needed by the node is rejected, and whether the slot needed by the node collides with slots requested and reserved by neighboring nodes within a predetermined range of the node, according to the start slot index; and updating by the node the start slot index of the node if one of the slot needed by the node is rejected and the slot needed by the node collides with the slots requested and reserved by the neighboring nodes within the predetermined range of the node.

19. The method according to claim 18, wherein the determining whether the slot needed by the node is rejected includes:

transmitting by the node slot request acknowledgement information including the slot needed by the node to the neighboring nodes within the predetermined range of the node; and determining that the slot needed by the node is rejected if the node receives slot request rejection information fed back by the neighboring nodes;

the determining whether the slot needed by the node collides with slots requested and reserved by neighboring nodes within a predetermined range of the node includes:

receiving by the node slot request acknowledgement information including slots needed by the neighboring nodes transmitted by the neighboring nodes within the predetermined range of the node; and determining that the slot needed by the node collides with the slots requested and reserved by the neighboring nodes within the predetermined range of the node if a slot index of at least one of the slots needed by the node is identical to a slot index of the slots requested and reserved by the neighboring nodes within the predetermined range of the node and a priority of the node is lower than that of the neighboring nodes.

20. A wireless network, including at least one node, wherein a node of the at least one node comprises:

a memory; and a processor coupled to the memory and configured to:
  determine an initial boundary value of a slot for slot allocation at a current slot allocation stage;
  calculate the number of slots needed by the node at the current slot allocation stage; and
  select a slot index needed by the current slot allocation stage starting from the initial boundary value.

* * * * *